US012580252B2

(12) United States Patent
Kim et al.

(10) Patent No.: US 12,580,252 B2
(45) Date of Patent: Mar. 17, 2026

(54) POUCH-TYPE BATTERY CASE AND POUCH-TYPE SECONDARY BATTERY

(71) Applicant: LG Energy Solution, Ltd., Seoul (KR)

(72) Inventors: Sang Hun Kim, Daejeon (KR); Gyung Soo Kang, Daejeon (KR); Jae Ho Lee, Daejeon (KR); Hyung Kyun Yu, Daejeon (KR); Ji Sun Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/529,144

(22) Filed: Dec. 5, 2023

(65) Prior Publication Data

US 2024/0213587 A1     Jun. 27, 2024

(30) Foreign Application Priority Data

Dec. 22, 2022     (KR) ........................ 10-2022-0182366

(51) Int. Cl.
H01M 50/126     (2021.01)
H01M 50/105     (2021.01)
(Continued)

(52) U.S. Cl.
CPC ....... H01M 50/126 (2021.01); H01M 50/105 (2021.01); H01M 50/119 (2021.01); H01M 50/121 (2021.01)

(58) Field of Classification Search
CPC ............. H01M 50/105; H01M 50/119; H01M 50/121; H01M 50/124; H01M 50/126;
(Continued)

(56) References Cited

U.S. PATENT DOCUMENTS

2012/0168800 A1*   7/2012  Kobayashi .............. H01L 33/62
                                                        174/536
2015/0044547 A1    2/2015  Lee et al.
                           (Continued)

FOREIGN PATENT DOCUMENTS

EP          3699974 A1     8/2020
JP      2012092361 A  *    5/2012
                 (Continued)

OTHER PUBLICATIONS

Machine translation of Japanese Patent Publication No. 2012-092361A, published May 17, 2012. (Year: 2012).*
(Continued)

*Primary Examiner* — Brian R Ohara
*Assistant Examiner* — Lilia Nedialkova
(74) *Attorney, Agent, or Firm* — Lerner David LLP

(57)     ABSTRACT

Disclosed herein is a pouch-type battery case including a pouch film laminate. A cup part can include a bottom surface and a side surface, and a flat part disposed to surround the cup part. The side surface can include a first curved portion, a planar portion, and a second curved portion, the pouch film laminate can include a base material layer, a sealant layer and gas barrier layer disposed therebetween. The pouch-type battery case is configured to satisfy Equation 1: $0.01 \leq D/\{A-(R_P+R_D+C)\}$, where D is the gas barrier layer thickness, A is a vertical depth of the cup part, $R_P$ is a curvature radius of the first curved portion between the bottom surface and the flat part, $R_D$ is a curvature radius of the second curved portion between the planar portion and the flat part, and C is a horizontal length of the planar portion.

16 Claims, 2 Drawing Sheets

(51) Int. Cl.
    *H01M 50/119*     (2021.01)
    *H01M 50/121*     (2021.01)

(58) Field of Classification Search
    CPC ............. H01M 50/129; H01M 50/131; H01M 50/133; Y02D 30/70; Y02E 60/10
    See application file for complete search history.

(56)           References Cited

U.S. PATENT DOCUMENTS

| | | | |
|---|---|---|---|
| 2016/0240824 A1 | 8/2016 | Song et al. | |
| 2017/0025647 A1* | 1/2017 | Taniguchi | H01M 50/119 |
| 2018/0019502 A1 | 1/2018 | Iizuka et al. | |
| 2018/0237882 A1* | 8/2018 | Unno | B21B 1/22 |
| 2020/0280044 A1 | 9/2020 | Park et al. | |
| 2021/0126305 A1* | 4/2021 | Zhang | H01M 50/105 |
| 2022/0085444 A1* | 3/2022 | Sasaki | H01M 50/1243 |
| 2022/0109203 A1 | 4/2022 | Oh et al. | |
| 2022/0367934 A1* | 11/2022 | Kim | H01M 10/658 |
| 2023/0318093 A1 | 10/2023 | Oh et al. | |
| 2023/0361389 A1 | 11/2023 | Oh et al. | |

FOREIGN PATENT DOCUMENTS

| | | | |
|---|---|---|---|
| KR | 20150017529 A | 2/2015 | |
| KR | 20160100137 A | 8/2016 | |
| KR | 20180008301 A | 1/2018 | |
| KR | 20190098581 A | 8/2019 | |
| KR | 102143366 B1 | 8/2020 | |
| KR | 20210068073 A | 6/2021 | |
| KR | 20220022844 A | 2/2022 | |
| KR | 20220022846 A | 2/2022 | |
| KR | 20220022847 A | 2/2022 | |
| KR | 20220045884 A | 4/2022 | |

OTHER PUBLICATIONS

International Search Report for Application No. PCT/KR2023/019728 mailed Mar. 12, 2024, pp. 1-3.
Written Opinion of the International Searching Authority for Application No. PCT/KR2023/019728 mailed Mar. 12, 2024, pp. 1-3.
Extended European Search Report including Written Opinion for Application No. 23907499.0 dated Sep. 18, 2025, pp. 1-7.

* cited by examiner

[FIG. 1]
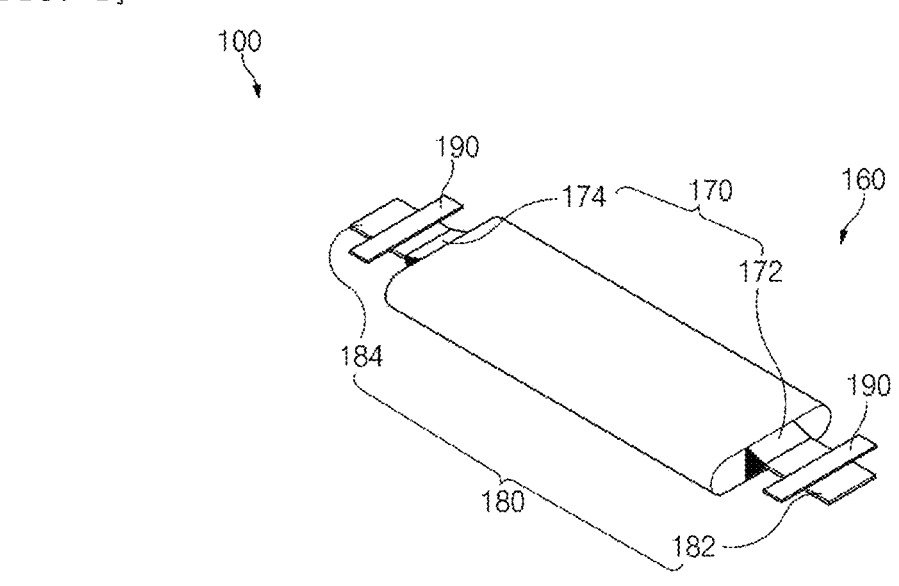
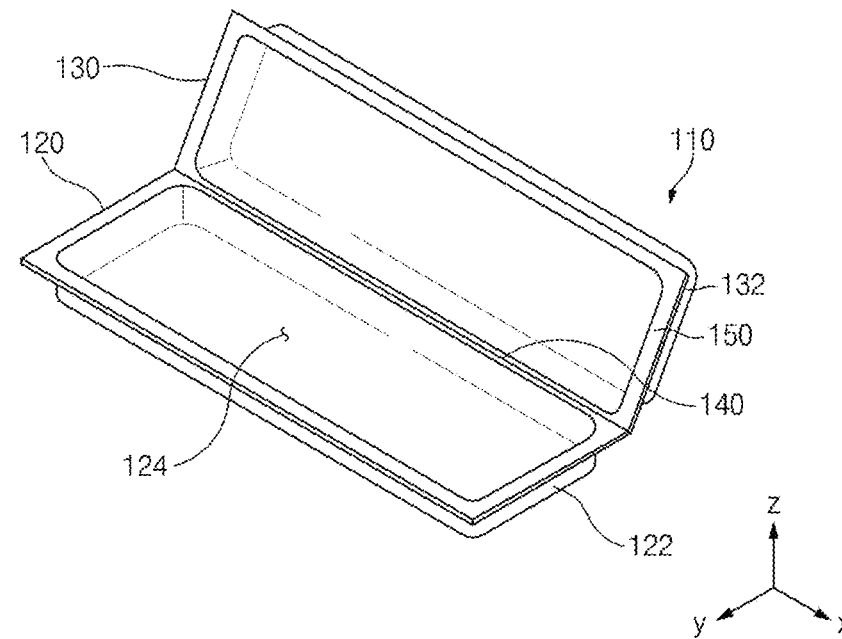

[FIG. 2]
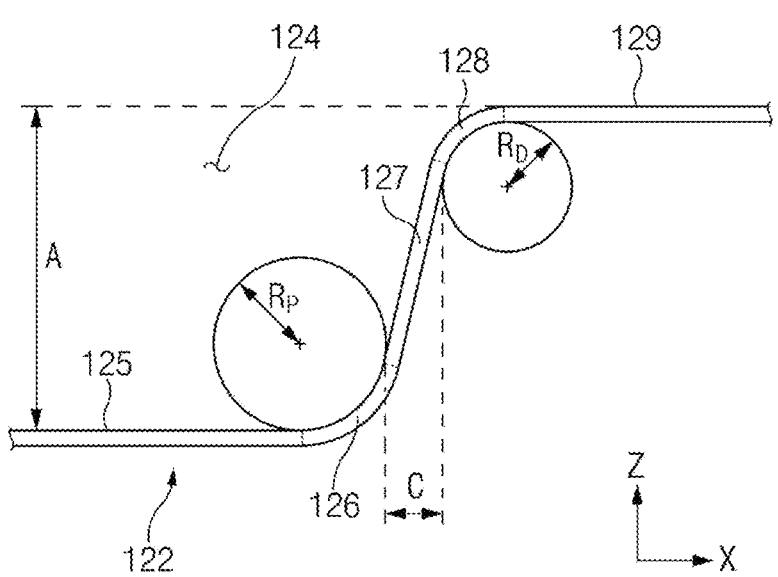

POUCH-TYPE BATTERY CASE AND POUCH-TYPE SECONDARY BATTERY

CROSS-REFERENCE TO RELATED APPLICATIONS

This application claims the priority of Korean Patent Application No. 10-2022-0182366 filed on Dec. 22, 2022, in the Korean Intellectual Property Office, the disclosure of which is incorporated herein by reference in its entirety.

FIELD OF INVENTION

The present disclosure relates to a pouch-type battery case and a pouch-type secondary battery including the same.

BACKGROUND OF THE INVENTION

In general, secondary batteries include nickel-cadmium batteries, nickel-hydrogen batteries, lithium ion batteries, and lithium ion polymer batteries. Such a secondary battery is being applied to be used in small-sized products such as digital cameras, P-DVDs, MP3Ps, mobile phones, PDAs, portable game devices, power tools, E-bikes, and the like as well as large-sized products requiring high power such as electric vehicles and hybrid vehicles, power storage devices for storing surplus power or renewable energy, and backup power storage devices.

In general, in order to manufacture the secondary battery, first, electrode active material slurry is applied to a positive electrode current collector and a negative electrode current collector to manufacture a positive electrode and a negative electrode. Then, the electrodes are stacked on both sides of a separator to form an electrode assembly. Also, the electrode assembly is accommodated in a battery case, and then the battery case is sealed after an electrolyte is injected therein.

Such a secondary battery is classified as a pouch-type secondary battery or a can-type secondary battery according to a material of a case accommodating the electrode assembly. In the pouch-type secondary battery, an electrode assembly is accommodated in a pouch made of a flexible polymer material. In the can-type secondary battery, an electrode assembly is accommodated in a case made of a metal or plastic material.

A pouch, which is a case of the pouch-type secondary battery, is manufactured by forming a cup part by performing press processing on a pouch film laminate having flexibility. When the cup part is formed, a secondary battery may be manufactured by accommodating the electrode assembly in the inner accommodating space of the cup part and sealing the sealing part.

In general, a pouch film laminate is formed as a plurality of layers in which a base material layer is stacked on one surface of a gas barrier layer made of a metal, and a sealant layer is stacked on the other surface. In the case of an aluminum pouch in which aluminum is applied to the gas barrier layer, the aluminum pouch has an advantage of securing mechanical strength having a predetermined level or more, being lightweight, and securing complementary and heat dissipation properties for the electrochemical properties of an electrode assembly and an electrolyte. However, the aluminum pouch has a limitation in that the pouch may be melted or deformed when an internal pressure and temperature of the cell increase due to fire or the like.

To prevent this limitation, a technique for preventing deformation due to an elevated temperature and high pressure has been developed by applying a high-strength material such as stainless steel instead of aluminum to the gas barrier layer.

However, since the pouch film laminate using the high-strength material as the gas barrier layer has poor moldability, it is not possible to secure a sufficient forming depth when forming the cup part. In some cases, there is a limitation in that the pouch film laminate is ruptured. Here, when the forming depth of the pouch film laminate is not secured, since the number of electrode assemblies accommodated therein is limited, it is difficult to improve cell energy density.

Thus, it is necessary to develop a pouch film having sufficient forming depth while securing durability under high temperature and high pressure conditions.

BRIEF SUMMARY OF THE INVENTION

An aspect of the present disclosure provides a pouch-type battery case capable of preventing a pouch from being damaged or preventing a pinhole from occurring during molding by controlling a parameter derived from a shape of a pouch cup part within a specific numeral range, and a pouch-type secondary battery.

According to an aspect of the present disclosure, there is provided a pouch-type battery case including a pouch film laminate. The pouch-type battery case may include a cup part including a bottom surface and a side surface, and a flat part disposed to surround the cup part. The side surface may include a first curved portion, a planar portion, and a second curved portion. The pouch film laminate may include a base material layer, a gas barrier layer, and a sealant layer, which may be sequentially stacked. The gas barrier layer may include stainless steel, and the pouch-type battery case may be configured to satisfy Equation 1 below.

$$0.01 \leq D/\{A - (R_P + R_D + C)\} \qquad \text{[Equation 1]}$$

In Equation 1 above, D is a thickness of the gas barrier layer, A is a vertical depth of the cup part, $R_P$ is a curvature radius of the first curved portion disposed between the bottom surface and the flat part, $R_P$ is a curvature radius of the second curved portion disposed between the planar portion and the flat part, and C is a horizontal length of the planar portion. In Equation 1 above, A may be a depth of the cup part in a depth direction, and C may be a projected length of the planar portion transverse to the depth direction.

Continuing in accordance with this aspect, the cup part may have a vertical depth A of at least about 8 mm.

Continuing in accordance with this aspect, the stainless steel may include about 10% wt to about 20% wt of chromium Continuing in accordance with this aspect, the stainless steel may include about 5% wt to about 20% wt of nickel.

Continuing in accordance with this aspect, the gas barrier layer may have a melting point of about 1,000° C. or more.

Continuing in accordance with this aspect, the gas barrier may have a thickness of about 50 μm or more.

Continuing in accordance with this aspect, the base material layer may have a thickness of about 5 μm to about 150 μm.

Continuing in accordance with this aspect, the base material layer may include polyethylene terephthalate (PET).

Continuing in accordance with this aspect, the pouch-type battery case may further include a first case and a second case, which may face each other. At least one of the first case or the second case may include the above-described pouch-type battery case.

According to another aspect of the present disclosure, there is provided a pouch-type secondary battery including the above-described pouch-type battery case.

According to another aspect of the present disclosure, there is provided a method for manufacturing a pouch-type battery case. A method according to this aspect may include the steps of providing a pouch film laminate including a base material layer, a gas barrier layer, and a sealant layer, that may be sequentially stacked, and molding the pouch film laminate to form a cup part and a flat part. The cup part may include a bottom surface and a side surface. The flat part may be formed to surround the cup part. The side surface may include a first curved portion, a second curved portion and a planar portion disposed between the first curved portion and the second curved portion. The first curved portion may be defined between the bottom surface and the planar portion. The second curved portion may be defined between the planar portion and the flat part. The gas barrier layer may include stainless steel. The pouch-type battery case may satisfy Equation 1 above.

In accordance with another aspect of the present disclosure, a pouch-type battery case with a pouch film laminate is provided. The pouch-type battery case according to this aspect may include a cup part and a flat part disposed around the cup part. The cup part may include a bottom surface and a side surface. The side surface may define a first curved portion, a second curved portion and a planar portion disposed between the first curved portion and the second curved portion. The first curved portion may be defined by a first radius between the bottom surface and the planar portion. The second curved portion may be defined by a second radius between the planar portion and the flat part. The cup part may have a depth extending along the side surface. The pouch film laminate may include a base material layer, a gas barrier layer, and a sealant layer. The gas barrier layer may be disposed between the base material layer and the sealant layer. The gas barrier layer may include stainless steel. A first value of the cup part may be defined by a sum of the first radius, the second radius and a projected length of the planar portion. The gas barrier layer may have a thickness that is at least 1% of a difference between the depth and the first value of the cup part.

Continuing in accordance with this aspect, the pouch film laminate may have a thickness of about 80 μm to about 300 μm.

Continuing in accordance with this aspect, the depth may be at least about 8 mm.

Continuing in accordance with this aspect, the stainless steel may include about 10% wt to about 20% wt of chromium.

Continuing in accordance with this aspect, the stainless steel may include about 5% wt to about 20% wt of nickel.

Continuing in accordance with this aspect, the gas barrier layer may have a melting point of about 1,000° C. or more.

Continuing in accordance with this aspect, the gas barrier layer may have a thickness of about 50 μm or more.

Continuing in accordance with this aspect, the base material layer may have a thickness of about 5 μm to about 150 μm.

Continuing in accordance with this aspect, the base material layer may include polyethylene terephthalate (PET).

BRIEF DESCRIPTION OF THE DRAWINGS

The above and other aspects, features and other advantages of the present disclosure will be more clearly understood from the following detailed description taken in conjunction with the accompanying drawings, in which:

FIG. 1 is an exploded view of a pouch-type secondary battery according to an embodiment of the present disclosure.

FIG. 2 is an enlarged cross-sectional view illustrating a portion of a pouch-type battery case in an x-z direction according to an embodiment of the present disclosure.

DETAILED DESCRIPTION

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims. Like reference numerals refer to like elements throughout.

Unless terms used in the present disclosure are defined differently, all terms (including technical and scientific terms) used herein have the same meaning as generally understood by those skilled in the art. Also, unless defined clearly and apparently in the description, the terms as defined in a commonly used dictionary are not ideally or excessively construed as having formal meaning.

In the following description, the technical terms are used only for explaining a specific exemplary embodiment while not limiting the present disclosure. In this specification, the terms of a singular form may comprise plural forms unless specifically mentioned. The meaning of "includes (comprises)" and/or "including (comprising)" does not exclude other components besides a mentioned component.

In this specification, a base material of "A and/or B" means a base material of A or B, or a mixture of A and B.

In this specification, reference symbol "%" means % by weight unless explicitly indicated otherwise.

Hereinafter, each configuration of the pouch-type battery case and the pouch-type secondary battery of the present disclosure will be described in more detail with reference to the drawings.

FIG. 1 is an exploded view of a pouch-type secondary battery 100 according to an embodiment of the present disclosure. As shown in FIG. 1, the pouch-type secondary battery 100 of the present disclosure includes a pouch-type battery case 110.

Pouch-Type Battery Case

The pouch-type battery case 110 according to the present disclosure including a pouch film laminate may include a cup part 122, 132 including a bottom surface 125 and a side surface and a flat part 129 disposed to surround the cup part 122. Here, the side surface may include a first curved portion 126, a planar portion 127, and a second curved portion 128. The pouch film laminate may include a base material layer, a gas barrier layer, and a sealant layer, which are sequentially stacked. Here, the gas barrier layer may include stainless steel, and the pouch-type battery case may satisfy Equation 1 below.

$$0.01 \le D/\{A - (R_P + R_D + C)\} \qquad \text{[Equation 1]}$$

In Equation 1 above, D is a thickness of the gas barrier layer, A is a vertical depth of the cup part measured along a vertical or depth direction, $R_P$ is a curvature radius of the first curved portion 126 disposed between the bottom surface 125 and the planar portion 127, $R_D$ is a curvature radius of the second curved portion 128 disposed between the planar portion 127 and the flat part 129, and C is a projected horizontal length of the planar portion 127 as best shown in FIG. 2.

In using stainless steel that is a high-strength material as a component of a gas barrier layer, the present disclosure may solve the limitation of deteriorating the moldability, which has been a limitation in the related art, by specifying a relationship between a thickness D of the gas barrier layer, a vertical depth A of the cup part, a curvature radius of each of the first curved portion and the second curved portion, and a horizontal length A of the planar portion. According to the present disclosure, in spite of the use of stainless steel as the component of the gas barrier layer, since moldability is excellent, sealing quality is improved, and a forming depth of the cup part is sufficiently secured, a pouch-type battery case having excellent durability and high moldability is achieved. Thus, according to the present disclosure, a pouch-type secondary battery having excellent durability against high temperature and a high pressure while improving a cell energy density because of accommodating a large number of electrode assemblies may be provided.

The pouch-type battery case 110 may accommodate the electrode assembly 160 therein. The pouch-type battery case 110 includes a pouch film laminate. Specifically, the pouch-type battery case 110 may be manufactured by drawing, molding, and stretching the pouch film laminate using a punch or the like.

FIG. 2 is an enlarged cross-sectional view illustrating a portion of the pouch-type battery case 110 in an x-z direction according to the present disclosure. As illustrated in FIG. 2, the pouch-type battery case 110 may include a cup part 122, an accommodation part 124 and a flat part 129. Specifically, the cup part 122, the accommodation part 124, and the flat part 129 may be formed in the pouch-type battery case 110 by molding and stretching the pouch film laminate.

The cup part 122 may mean a concavely molded portion of the pouch film laminate. As illustrated in FIG. 2, the cup part 122 may include a bottom surface 125 and a side surface, and the side surface may include a first curved portion 126, a planar portion 127, and a second curved portion 128. The first curved portion 126 may be disposed between the bottom surface 125 and the planar portion 127, and the second curved portion 128 may be disposed between the planar portion 127 and the flat part 129. Each of the bottom surface 125 and the planar portion 127 may have a planar shape, and each of the first curved portion 126 and the second curved portion 128 may have a curved shape. Thus, in FIG. 2, each of the bottom surface 125 and the planar portion 127 is illustrated in a straight line shape, and each of the first curved portion 126 and the second curved portion 128 is illustrated in a curved shape.

The accommodation part 124 may mean an accommodating space defined inside the cup part 122 in the form of a bag as the cup part 122 is provided. The electrode assembly 160 may be accommodated in the cup part 122.

The flat part 129 may mean a non-concave portion of the pouch film laminate. The flat part 129 may be disposed to surround the cup part 122. Specifically, the flat part 129 may be disposed along an edge of the cup part 122. When the pouch-type battery case 110 is sealed, at least a portion of the flat part 129 may be sealed, and the sealed area of the flat part 129 may correspond to a sealing part 150. The flat part 129 may have a planar shape, and thus, in FIG. 2, the flat part 129 is illustrated in a straight line shape.

Reference symbol A means a vertical depth of the cup part 122. Specifically, vertical depth A may be a depth of the cup part 122 in a direction perpendicular to the bottom surface 125. For example, the vertical depth A may be a depth of the cup part 122 in a z-axis direction in FIG. 2. The vertical depth A may be specifically about 8 mm or more.

Reference symbol $R_P$ means a curvature radius of the first curved portion 126 disposed between the bottom surface 125 and the planar portion 127. $R_P$ may be specifically about 0.5 mm to about 10 mm, more specifically about 0.7 mm to about 3 mm, and even more specifically about 1 mm to about 2 mm. When $R_P$ is in the above range, an effect of securing moldability according to Equation 1 may be implemented while minimizing stress applied to the first curved portion.

Reference symbol $R_D$ means a curvature radius of the second curved portion 128 disposed between the planar portion 127 and the flat part 129. $R_D$ may be specifically about 0.5 mm to about 3 mm, more specifically about 0.7 mm to about 2.5 mm, and even more specifically about 1 mm to about 2 mm. When $R_D$ is in the above range, an effect of securing moldability according to Equation 1 may be implemented while minimizing stress applied to the second curved portion.

Reference symbol C means a horizontal length of the planar portion 127. Specifically, C may be a projected length of the planar portion 127 in a direction parallel to the bottom surface 125. For example, C may be a length of the planar portion 127 in the x-axis direction in FIG. 2. Here, C means a clearance of the cup part 122. C may be specifically about 0.5 mm to about 2 mm, more specifically about 0.7 mm to about 1.5 mm, and even more specifically about 0.8 mm to about 1.2 mm. When C is in the above range, possibility of rupture of the pouch film laminate may be reduced to a desirable level while sufficiently securing a forming depth of the cup part.

In Equation 1–A, $R_p$, $R_d$, and C may be implemented through, for example, adjustment of the punch shape, processing, and elongation of the pouch molding equipment.

According to the present disclosure, $D/\{A-(R_P+R_P+C)\}$ may be greater than or equal to about 0.01, may be specifically about 0.01 to about 0.02, and more specifically about 0.01 to about 0.015. Here, reference symbol D is a thickness of the gas barrier layer to be described later. When the parameter $D/\{A-(R_P+R_P+C)\}$ is less than about 0.01, stress may be excessively concentrated to a stretched area of the pouch film laminate (e.g., the first curved portion 126 and/or the second curved portion 128) which may damage the pouch or generate a pinhole. On the other hand, when the parameter $D/\{A-(R_P+R_P+C)\}$ is greater than or equal to about 0.01, the pouch may be molded without damaging the pouch film laminate within the thickness range of the pouch film laminate, which is commonly used for manufacturing medium and large-sized batteries. Thus, it is not necessary to increase thickness of the pouch film laminate for moldability, allowing for greater cell energy density.

In the pouch-type battery case 110 according to the present disclosure, the vertical depth A of the cup part 122 may be about 8 mm or more, specifically about 8 mm to about 20 mm, and more specifically about 10 mm to about 20 mm. In the related art, when the cup part is molded to have a vertical depth of about 8 mm or more, there is a limitation in that the excessive stress is concentrated in the curved portion of the cup part, resulting in cracks in the pouch film laminate. On the other hand, when the parameter D/{A−(RP+RD+C)} is controlled to be about 0.01 or more as in the present disclosure, since the cup part 122 is molded so that the vertical depth A is about 8 mm or more without cracking the pouch film laminate, the energy density of the pouch-type secondary battery may increase by sufficiently securing the forming depth of the pouch.

The thickness of the pouch film laminate may be specifically about 80 μm to about 300 μm, more specifically about 80 μm to about 250 μm, more specifically about 100 μm to about 250 μm, and more specifically about 120 μm to about 230 μm, and when in the above range, since the thickness of the pouch film laminate is relatively thin to easily process the pouch, and it is not necessary to increase in thickness of the base material layer, thereby improving the moldability, it may be advantageous in terms of the heat transfer during the pouch sealing. Additionally, when in the above range, it may be possible to increase the cell energy density by accommodating more electrode assemblies into the same thickness of the cell.

The pouch film laminate according to the present disclosure includes a base material layer, a gas barrier layer, and a sealant layer. In the pouch film laminate, the base material layer, the gas barrier layer, and the sealant layer are sequentially stacked. In addition, an adhesive layer may be additionally disposed between the layers.

Base Material Layer

The base material layer is formed at the outermost layer of the pouch film laminate to protect a secondary battery from external friction and collision. The base material layer may be made of a polymer to electrically insulate the electrode assembly from the outside.

The thickness of the base material layer may be about μm to about 150 μm, specifically about 5 μm to about 80 μm, and more specifically about 5 μm to about 60 μm. When the thickness of the base layer satisfies the above range, the entire thickness of the pouch may not be excessively thick, and thus, the energy density versus volume of the secondary battery may be excellent, and insulation and chemical resistance of the pouch may be secured.

The base material layer may be made of at least one or more materials selected from the group consisting of polyethylene, polypropylene, polycarbonate, polyethylene terephthalate, polyvinyl chloride, acrylic polymer, polyacrylonitrile, polyimide, polyamide, cellulose, aramid, nylon, polyester, polyparaphenylene benzobisoxazole, polyarylate, teflon, and glass fiber. The base material layer may be made of polyethylene terephthalate (PET), nylon, or a combination thereof having wear resistance and heat resistance. More specifically, the base layer may include polyethylene terephthalate. More specifically, the base material layer may include polyethylene terephthalate or polyethylene terephthalate and nylon.

The base material layer may have a single film structure.

The base material layer may be made of at least one or more materials selected from the group consisting of polyethylene, polypropylene, polycarbonate, polyethylene terephthalate, polyvinyl chloride, acrylic polymer, polyacrylonitrile, polyimide, polyamide, cellulose, aramid, nylon, polyester, polyparaphenylene benzobisoxazole, polyarylate, teflon, and glass fiber. The base material layer may include at least one of polyester-based films such as polyethylene terephthalate and polybutylene terephthalate having wear resistance and heat resistance, specifically polyethylene terephthalate, but is not limited thereto.

In the present disclosure, the pouch film laminate may further include an adhesive layer disposed between the base material layer and the gas barrier layer to be described later.

The adhesive layer may be introduced for adhesion or attachment between the base material layer and the gas barrier layer, and an adhesive layer known in the art may be used without limitation.

That is, the base material layer may have a composite layer structure which is constituted by layers respectively made of two or more materials. An adhesive layer may be additionally formed between the layers in the composite film structure.

Specifically, the base material layer according to the present disclosure may include a first base material layer, a second base material layer and/or an adhesive layer. Here, the thickness of the base material layer means the total thickness of the first base material layer, the second base material layer, and/or the adhesive layer. The first base material layer may be disposed at the outermost layer of the pouch film laminate, and the second base material layer may be disposed between the first base material layer and the gas barrier layer. The adhesive layer may be disposed between the first base material layer and the second base material layer or may be disposed between the second base material layer and the gas barrier layer. The first base material layer, the second base material layer, and the adhesive layer may be made of materials having different material and/or physical properties, respectively. An interface may exist between the first base material layer, the second base material layer, and the adhesive layer. This means that the first base material layer, the second base material layer, and the adhesive layer are different layers and are formed separately.

The first base material layer may be a layer disposed at the outermost layer of the pouch film laminate. In this case, the first base material layer may serve to prevent moisture from being permeated from the outside of the pouch. The first base material layer may be made of at least one or more materials selected from the group consisting of polyethylene, polypropylene, polycarbonate, polyethylene terephthalate, polyvinyl chloride, acrylic polymer, polyacrylonitrile, polyimide, polyamide, cellulose, aramid, nylon, polyester, polyparaphenylene benzobisoxazole, polyarylate, teflon, and glass fiber. The first base material layer may include at least one or more of polyester-based films such as polyethylene terephthalate and polybutylene terephthalate having wear resistance and heat resistance, but is not limited thereto.

As described above, the second base material layer may be a layer disposed between the first base material layer and the gas barrier layer. In this case, the second base material layer may serve to improve the moldability of the pouch. The second base material layer may include at least one of polyamide-based films such as nylon 6, nylon 6,6, nylon MXD6, and nylon 4,10, but is not limited thereto. The second base material layer may include nylon 6, and in this case, the moldability of the pouch may be improved due to the excellent stretchability of nylon 6.

Gas Barrier Layer

The gas barrier layer is stacked between the base material layer and the sealant layer to secure mechanical strength of the pouch, block introduction and discharge of a gas or moisture outside the secondary battery, and prevent an electrolyte from leaking from the pouch-type battery case.

The gas barrier layer according to the present disclosure includes stainless steel. Specifically, the gas barrier layer may be manufactured by forming and/or processing a stainless steel thin film. The gas barrier layer made of stainless steel may have relatively low thermal conductivity to effectively prevent or delay heat diffusion to other cells in case of the thermal runaway and may have relatively high toughness to suppress an occurrence of cracks of the pouch during use of the pouch-type battery. When stainless steel is contained in the gas barrier layer, there is a limitation of deteriorating the moldability of the pouch film laminate. However, as described above, in the pouch-type battery case of the present disclosure, a relationship between the thickness of the gas barrier layer, the vertical depth of the cup part, the curvature radius of each of the first curved portion and the second curved portion, and the horizontal length of the flat part may be adjusted by a specific relational expression (Equation 1) to implement a pouch film, which exhibits improved durability at a high temperature and a high pressure and also improved moldability.

The stainless steel may include at least one material selected from the group consisting of copper (Cu), chromium (Cr), manganese (Mn), nickel (Ni), magnesium (Mg), silicon (Si), zinc (Zn), molybdenum (Mo), carbon (c), phosphorus (P), sulfur (S), and nitrogen (N) other than iron (Fe).

Specifically, stainless steel may include about 10 wt % to about 20 wt %, specifically about 16 wt % to about 20 wt %, and more specifically about 18 wt % to about 20 wt % of chromium. When the above numerical range is satisfied, stainless steel provides excellent corrosion resistance.

In addition, stainless steel may include about 5 wt % to about 20 wt %, specifically about 6 wt % to about 15 wt %, and more specifically about 8 wt % to about 14 wt % of nickel. When the above numerical range is satisfied, there is further improvement in the corrosion resistance of stainless steel to neutral/weak acidity.

The thickness of the gas barrier layer may be about 50 μm or more, specifically about 50 μm to about 100 μm, and more specifically about 60 μm to about 85 μm. When the thickness of the gas barrier layer satisfies the above numerical range, an elongation of the pouch film laminate may increase as the gas barrier layer is evenly stretched to improve the moldability of the pouch and ensure the sufficient forming depth for the pouch cup part. As a result, it is easy to implement a large-area pouch-type battery applied to an electric vehicle.

Since the gas barrier layer according to the present disclosure includes stainless steel, there may be little or no change in thickness of the gas barrier layer according to a process of forming or stretching the cup part of the pouch film laminate. In this aspect, the thickness of the gas barrier layer (or D in Equation 1) may mean the thickness of the gas barrier layer before forming the cup part or may mean the thickness of the gas barrier layer after forming the cup part. More specifically, in the present specification, the thickness of the gas barrier layer (or D in Equation 1) may mean the thickness of the gas barrier layer in the flat part 129.

A melting point of the gas barrier layer may be about 1,000° C. or more, specifically about 1,200° C. to about 1,500° C., and more specifically about 1,300° C. to about 1,450° C. When the melting point of the gas barrier layer satisfies the above numerical range, structural collapse of the pouch may be prevented even when a temperature of the pouch cell rapidly rises due to thermal runaway.

Sealant Layer

The sealant layer is configured to completely seal the inside of the pouch-type battery case by being thermally bonded mutually at the sealing part when the pouch-type battery case accommodating the electrode assembly therein is sealed. For this, the sealant layer may be made of a material having excellent thermal bonding strength.

The sealant layer may be made of a material having insulation, corrosion resistance, and sealing properties. Specifically, since the sealant layer is in direct contact with the electrode assembly and/or the electrolyte inside the pouch-type battery case, the sealant layer may be made of a material having insulation and corrosion resistance. In addition, since the sealant layer must completely seal the inside of the pouch-type battery case and block material movement between the inside and outside, the sealant layer may be made of a material having high sealing performance (e.g., excellent thermal bonding strength). To secure the insulation, the corrosion resistance, and the sealing properties, the sealant layer may be made of a polymer material.

The sealant layer may be made of at least one or more materials selected from the group consisting of polyethylene, polypropylene, polycarbonate, polyethylene terephthalate, polyvinyl chloride, acrylic polymer, polyacrylonitrile, polyimide, polyamide, cellulose, aramid, nylon, polyester, polyparaphenylene benzobisoxazole, polyarylate, teflon, and glass fiber. Preferably, it may be made of a polyolefin-based resin such as polypropylene (PP) and/or polyethylene (PE), particularly made of a polyolefin-based resin such as polypropylene (PP) and/or polyethylene (PE). In this case, polypropylene consists of unstretched polypropylene (CPP), acid modified polypropylene (PPa), polypropylene-ethylene copolymer and/or polypropylene-butylene-ethylene terpolymer.

The thickness of the sealant layer may be about 30 μm to about 130 μm, specifically about 50 μm to about 120 μm, and more specifically about 70 μm to about 100 μm. When the thickness of the sealant layer satisfies the above range, improved moldability of the pouch film laminate and sealing strength of the sealing part is achieved.

The sealant layer may have a single film structure made of any one material. Alternatively, the sealant layer may have a composite film structure which is constituted by layers respectively made of two or more materials.

According to an embodiment of the present disclosure, the pouch-type battery case may include a first case 120 and a second case 130 facing each other as shown in FIG. 1. Here, at least one of the first case 120 or the second case 130 may be the aforementioned pouch-type battery case.

For example, when the first case is the pouch-type battery case according to the present disclosure, the second case may include the pouch film laminate including the base material layer, the gas barrier layer, and the sealant layer, which are sequentially stacked, and the cup part may not be provided in another embodiment. More specifically, the second case may be provided as a flat surface without the cup part. The second case may function as a cover case covering the first case accommodating the electrode assembly from an upper side. One side of the first case and one side of the second case may be connected to each other or may be separated from each other so as to be manufactured separately. In this case, the second case may be equally applicable to the description of the pouch film laminate, except that the cup part and the flat part are not distinguished from each other.

Both the first case and the second case may be the aforementioned pouch-type battery case. Particularly, as illustrated in FIG. 1, the first case 120 may include an accommodation part 124 capable of accommodating the electrode assembly 160, and the second case 130 may cover the accommodation part 124 from an upper side to prevent the electrode assembly 160 from being separated outward from the battery case. As illustrated in FIG. 1, one side of the first case 120 and one side of the second case 130 may be connected to each other. However, the present disclosure is not limited thereto. For example, the first case 120 and the second case 130 may be separately manufactured to be separated from each other.

When both the first case and the second case are the aforementioned pouch-type battery case, the two cup parts 122 and 132, which are symmetrical to each other may be drawn and molded to one pouch film laminate so as to be adjacent to each other. In this case, as illustrated in FIG. 1, the cup parts 122 and 132 may be formed in the first case 120 and the second case 130, respectively. After accommodating the electrode assembly 160 in the accommodation part 124 provided in the cup part 122 of the first case 120, a bridge part 140 formed between the two cup parts 122 and 132 may be folded so that the two cup parts 122 and 132 face each other. In this case, the cup part 132 of the second case 130 also accommodates the electrode assembly 160 from the upper side thereof. Thus, since the two cup parts 122 and 132 accommodate one electrode assembly 160, the electrode assembly 160 having a thicker thickness may be accommodated when compared to a case in which one cup part 122 is provided. In addition, since the pouch-type battery case 110 is folded to form one edge of the secondary battery 100, the number of edges to be sealed may be reduced when a sealing process is performed later. Thus, a process speed of the pouch-type secondary battery 100 may be improved, and the number of sealing processes may be reduced.

The pouch-type battery case 110 may be sealed in a state of accommodating the electrode assembly 160 so that a portion of the electrode lead 180, i.e., a terminal part is exposed. Particularly, when the electrode lead 180 is connected to the electrode tab 170 of the electrode assembly 160, and the insulating part 190 is formed on a portion of the electrode lead 180, the electrode assembly 160 may be accommodated in the accommodation part 124 provided in the cup part 122 of the first case 120, and the second case 130 may cover the accommodation part 124 from the upper side. Then, an electrolyte may be injected into the accommodation part 124, and the sealing part 150 formed on the edges of the first case 120 and the second case 130 may be sealed.

The sealing part 150 may serve to seal the accommodation part 124. Specifically, the sealing part 150 may seal the accommodation part 124 while being formed along the edge of the accommodation part 124. A sealing temperature of the sealing part 150 may be about 180° C. to about 250° C., particularly about 200° C. to about 250° C., and more particularly about 210° C. to about 240° C. When the sealing temperature satisfies the above numerical range, the pouch-type battery case 110 may secure sufficient sealing strength by thermal bonding.

Manufacturing Method of Pouch-Type Battery Case

In addition, the present disclosure may provide a method for manufacturing a pouch-type battery case. The method of manufacturing the pouch-type battery case may be the method of manufacturing the pouch-type battery case described above.

Particularly, a method for manufacturing the pouch-type battery case includes: preparing a pouch film laminate including a base material layer, a gas barrier layer, and a sealant layer, which are sequentially stacked; and molding the pouch film laminate to form a cup part and a flat part. Here, the cup part includes a bottom surface and a side surface, the flat part is formed to surround the cup part, the side surface includes a first curved portion, a planar portion, and a second curved portion, the gas barrier layer includes stainless steel, and Equation 1 below is satisfied.

$$0.01 \le D/\{A - (R_P + R_D + C)\}$$

(In Equation 1, D is the thickness of the gas barrier layer, A is the depth of the cup part in the vertical direction, $R_P$ is the curvature radius of the first curved portion disposed between the bottom surface and the planar portion, $R_D$ is the is the curvature radius of the second curved portion disposed between the planar portion and the flat part, and C is the length of the planar portion in the horizontal direction.)

In the method for manufacturing the pouch-type battery case according to the present disclosure, descriptions of the pouch film laminate, the base material layer, the gas barrier layer, the sealant layer, the cup part, the flat part, the bottom surface, and the side surface may be the same as those described in the foregoing pouch-type battery case.

According to the present disclosure, in the pouch film laminate using the gas barrier layer containing stainless steel, the relationship between the thickness of the gas barrier layer, the vertical depth of the cup part, the curvature radius of each of the first curved portion and the second curved portion, and the horizontal length of the flat part is adjusted according to Equation 1, it is possible to manufacture the pouch-type battery case having excellent moldability. Thus, as a high-strength material is used as a component of the gas barrier layer, it is possible to manufacture the pouch-type secondary battery having the excellent durability against the high heat and the high pressure and having the improved cell energy density due to the deep forming depth.

Pouch-Type Secondary Battery

The pouch-type secondary battery 100 according to the present disclosure includes the pouch-type battery case 110 described above. In addition, the pouch-type secondary include an electrode assembly 160, an battery 100 may electrode lead 180, an insulating part 190, and an electrolyte (not shown).

Electrode Assembly

The electrode assembly 160 may be inserted into the pouch-type battery case 110 and then sealed by the pouch-type battery case 110 after the electrolyte is injected.

The electrode assembly 160 may be formed by sequentially stacking a positive electrode, a separator, and a negative electrode. Particularly, the electrode assembly 160 may include two types of electrodes such as the positive electrode and the negative electrode and the separator disposed between the electrodes to insulate the electrodes from each other.

Each of the positive electrode and the negative electrode may have a structure in which active material slurry is applied to the electrode current collector having a metal foil or metal mesh shape. The slurry may be usually formed by agitating a granular active material, an auxiliary conductor, a conductive material, and a plasticizer with a solvent added. A solvent may be removed in a subsequent process.

Slurry, in which the electrode active material, the binder and/or the conductive material are mixed, may be applied to a positive electrode current collector and a negative electrode current collector to manufacture a positive electrode and a negative electrode. Then, the positive electrode and the negative electrode may be stacked on both sides of a separator to manufacture an electrode assembly 160 having a predetermined shape. The types of electrode assembly 160 may include a stack type, a jelly-roll type, a stack and folding type, and the like, but is not limited thereto.

The electrode assembly 160 may include an electrode tab 170.

The electrode tab 170 may be connected to each of the positive electrode and the negative electrode of the electrode assembly 160 to protrude outward from the electrode assembly 160, thereby providing a path, through which electrons are moved, between the inside and outside of the electrode assembly 160. The electrode current collector provided in the electrode assembly 160 may be constituted by a portion coated with the electrode active material and a distal end, on which the electrode active material is not applied, i.e., a non-coating portion. The electrode tab 170 may be provided by cutting the non-coating portion or by connecting the separate conductive member to the non-coating portion through ultrasonic welding. As illustrated in FIG. 1, the electrode tabs 170 may protrude in different directions of the electrode assembly 160, respectively, but is not limited thereto. For example, the electrode tabs 270 may protrude in various directions, for example, protrude in parallel to each other from one side in the same direction.

Electrode Lead

The electrode lead 180 may supply electricity to the outside of the secondary battery 200. The electrode lead 180 may be connected to the electrode tab 170 of the electrode assembly 160 by spot welding or the like.

The electrode lead 180 may be connected to the electrode assembly 160 and protrude out of the pouch-type battery case 110 via the sealing part 150. Specifically, one end of the electrode lead 180 may be connected to the electrode assembly 160, particularly the electrode tab 170, and the other end of the electrode lead 180 may protrude out of the pouch-type battery case 110.

The electrode leads 180 may include a positive electrode lead 182 having one end connected to the positive electrode tab 172 to extend in a direction in which the positive electrode tab 172 protrudes and a negative electrode lead 184 having one end connected to the negative electrode tab 174 to extend in a direction in which the negative electrode tab 174 protrudes. The other ends of both the positive electrode lead 182 and the negative electrode lead 184 may protrude out of the battery case 110. Thus, electricity generated in the electrode assembly 160 may be supplied to the outside. Also, since each of the positive electrode tab 172 and the negative electrode tab 174 is formed to protrude in various directions, each of the positive electrode lead 182 and the negative electrode lead 184 may extend in various directions. The positive electrode lead 182 and the negative electrode lead 184 may be made of materials different from each other. That is, the positive electrode lead 182 may be made of the same material as the positive electrode current collector, i.e., an aluminum (Al) material, and the negative electrode lead 184 may be made of the same material as the negative electrode current collector, i.e., a copper (Cu) material or a copper material coated with nickel (Ni). A portion of the electrode lead 180, which protrudes to the outside of the battery case 110, may be provided as a terminal part and electrically connected to an external terminal.

Insulating Part

The insulating part 190 may prevent the electricity generated from the electrode assembly 160 from flowing to the battery case 110 through the electrode lead 180 and may maintain the sealing of the battery case 110. For this, the insulating part 190 may be made of a non-conductive material having non-conductivity, which is not electrically conductive. In general, although an insulation tape which is easily attached to the electrode lead 180 and has a relatively thin thickness is mainly used as the insulating part 190, the present disclosure is not limited thereto. For example, any member may be used as the insulating part 14 as long as the member is capable of insulating the electrode lead 180.

The insulating part 190 may be disposed to surround a portion of an outer circumference of the electrode lead 180. Particularly, at least a portion of the electrode lead 180 may be surrounded by the insulating part 190. In this case, the insulating part 190 may be disposed between the electrode lead 180 and the pouch-type battery case 110. The insulation part 190 may be disposed to be limited within the sealing part 150, on which a first case 120 and a second case 130 of the pouch-type battery case 110 are thermally fused, so that the electrode lead 180 is bonded to the battery case 110.

Electrolyte

The pouch-type secondary battery 100 according to the present disclosure may further include an electrolyte (not shown) injected into the pouch-type battery case 110. The electrolyte may move lithium ions generated by electrochemical reaction of the electrode during charging and discharging of the secondary battery 200. The electrolyte may include a non-aqueous organic electrolyte that is a mixture of a lithium salt and an organic solvent or a polymer using a polymer electrolyte. Furthermore, the electrolyte may include a sulfide-based, oxide-based, or polymer-based solid electrolyte, and the solid electrolyte may have flexibility that is easily deformed by external force.

Hereinafter, the present disclosure will be described in detail with reference to an exemplary embodiment. However, the following embodiment is merely illustrative, and the present disclosure is not limited to the following embodiment. It is obvious to those skilled in the art that various changes and modifications are possible within the scope and spirit of the present disclosure, and it is natural that these changes and modifications fall within the scope of the appended claims.

Manufacture Example 1: Manufacture of Pouch
Film Laminate

A first adhesive film having a width of about 266 mm, a length of about 50 m, and a thickness of about 80 μm and a polyethylene terephthalate (PET) film having a width of 266 mm, a length of 50 m, and a thickness of 6 μm were sequentially stacked on one surface of a stainless steel thin film having a width of about 266 mm, a length of about 50 m, and a thickness of about 40 μm. A polypropylene (PP) film having a width of about 266 mm, a length of about 50 m, and a thickness of about 80 μm was stacked on the other surface of the stainless steel thin film. As a result, a pouch film laminate having a structure in which polypropylene film/stainless steel thin film/first adhesive film/polyethylene terephthalate film are sequentially stacked was manufactured.

Here, an SUS grade of the stainless steel provided in the stainless steel thin film was SUS304L.

Here, the polypropylene film is used for a sealant layer, the stainless steel thin film is used for a gas barrier layer, and the first adhesive film and the polyethylene terephthalate film are used for a base material layer.

Manufacture Example 2: Manufacture of Pouch
Film Laminate

A pouch film laminate was manufactured in the same manner as in Embodiment 1, except that a stainless steel thin film having a thickness of about 60 μm was used.

An SUS grade of the stainless steel provided in the stainless steel thin film of Manufacture Example 2 was SUS304L.

Manufacture Example 3: Manufacture of Pouch Film Laminate

A pouch film laminate was manufactured in the same manner as in Embodiment 1, except that a stainless steel thin film having a thickness of about 50 μm was used.

An SUS grade of the stainless steel provided in the stainless steel thin film of Manufacture Example 3 was SUS304L.

Manufacture Example 4: Manufacture of Pouch Film Laminate

The pouch film laminate was manufactured in the same method as in Embodiment 1 except that a first adhesive film having a width of about 266 mm, a length of about 50 m, and a thickness of about 3 μm, a nylon film having a width of about 266 mm, a length of about 50 m, and a thickness of about 25 μm, a second adhesive film having a width of about 266 mm, a length of about 50 m, and a thickness of about 3 μm, and a polyethylene terephthalate (PET) film having a

16 adhesive film having a thickness of about 3 μm is used, and a stainless steel thin film having a thickness of about 60 μm is used as the substrate layer.

Experimental Example 1: Evaluation of Moldability of Pouch Film Laminate

Moldability of each of the pouch film laminates manufactured in Manufacture Examples 1 to 5 was evaluated.

Particularly, when the pouch film laminate was cut into a width of about 266 mm and a length of about 200 mm, and then, the pouch film laminate, which is cut using Kwangshin Hi-Tech's pouch forming equipment, is processed and stretched to mold a cup part having a width of about 90 mm and a length of about 160 mm so as to have a target forming depth. The molding of the cup part was formed 10 times in total to visually check whether the pouch film laminate is ruptured during the molding of the cup part, thereby evaluating the moldability based on the following criteria. Embodiment and Comparative Example are classified based on the moldability evaluation results, and the results are shown in Table 1 below.

Good: No rupture of pouch film laminate when measured 10 times

Faulty: When measured 10 times, there was more than one case of rupture of pouch film laminate

TABLE 1

| | | Gas barrier layer thickness D (mm) | Target forming depth A (mm) | $R_P$ (mm) | $R_D$ (mm) | C (mm) | A – ($R_P$ + $R_D$ + C) (mm) | D/ {A – ($R_P$ + $R_D$ + C)} | Moldability Evaluation (Good/ Faulty) | Number of rupture (when measured 10 times) |
|---|---|---|---|---|---|---|---|---|---|---|
| Manufacturing Example 1 | Embodiment 1 | 0.08 | 10 | 1.5 | 1.5 | 1 | 6 | 0.0133 | Good | 0 |
| | Comparative Example 1 | 0.08 | 10 | 0.5 | 0.5 | 0.5 | 8.5 | 0.0094 | Faulty | 4 |
| Manufacturing Example 2 | Embodiment 2 | 0.06 | 9 | 1.5 | 1.5 | 1 | 5 | 0.012 | Good | 0 |
| | Comparative Example 2 | 0.06 | 8 | 0.5 | 0.5 | 0.5 | 6.5 | 0.0092 | Faulty | 6 |
| Manufacturing Example 3 | Embodiment 3 | 0.05 | 8 | 1.5 | 1.5 | 1 | 4 | 0.0125 | Good | 0 |
| | Comparative Example 3 | 0.05 | 7 | 0.5 | 0.5 | 0.5 | 5.5 | 0.0091 | Faulty | 10 |
| Manufacturing Example 4 | Embodiment 4 | 0.08 | 10 | 1.5 | 1.5 | 1 | 6 | 0.0133 | Good | 0 |
| | Comparative Example 4 | 0.08 | 10 | 0.5 | 0.5 | 0.5 | 8.5 | 0.0094 | Faulty | 3 |
| Manufacturing Example 5 | Comparative Example 5 | 0.06 | 8 | 0.5 | 0.5 | 0.5 | 6.5 | 0.0092 | Faulty | 7 | width of 266 mm, a length of 50 m, and a thickness of 25 μm are sequentially stacked on one surface of a stainless steel thin film having a width of about 266 mm, a length of about 50 m, and a thickness of about 80 μm.

An SUS grade of the stainless steel provided in the stainless steel thin film of Manufacture Example 4 was SUS304L.

Here, the polypropylene film is used for a sealant layer, the stainless steel thin film is used for a gas barrier layer, and the first adhesive film, the nylon film, the second adhesive film, and the polyethylene terephthalate film are used for a base material layer.

Manufacture Example 5: Manufacture of Pouch Film Laminate

A pouch film laminate was manufactured in the same manner as in Embodiment 1, except that only the first According to Table 1, in the case of Embodiments 1 to 4 in which D/{A–($R_P$+$R_D$+C)} is 0.01 or more, it was confirmed that the moldability superior to the Comparative Examples 1 to 5 in which D/{A–($R_P$+$R_D$+C)} is less than 0.01.

In addition, when compared to Comparative Examples 1 to 4, since the forming depth is deep to realize excellent moldability in Embodiments 1 to 4, it may be understood that a larger number of electrode assemblies are accommodated in the desired pouch-type secondary battery. Therefore, it may be expected that, in Examples 1 to 4 that satisfy Equation 1, the high-strength material is used as the component of the gas barrier layer to implement the secondary battery density while having the having the high cell energy excellent mechanical strength and durability.

The pouch-type battery case according to the present disclosure may include the pouch film laminate in which the base material layer, the gas barrier layer, and the sealant layer, which are sequentially stacked, the gas barrier layer may include stainless steel, the pouch film laminate may have a thickness of about 80 μm to about 300 μm, the pouch-type battery case may include the cup part and the flat part, and the relational expression (Equation 1, D/{A−(R_P+ R_P+C)}) of the thickness of the gas barrier layer, the length of the cup part, and the length of the flat part, etc. is about 0.01 or more. When all of the above conditions are satisfied, the durability of the pouch-type battery case at elevated temperature and the high pressure may be improved, and also, the damage of the pouch or the occurrence of the pinhole during the molding may be prevented, and the forming depth of the pouch may be secured. The pouch-type secondary battery including the pouch-type battery case may have the excellent durability against the high heat and the high pressure, the excellent mechanical strength, and simultaneously, may secure the sufficient forming depth to increase in cell energy density.

In addition, in the method for manufacturing the pouch-type battery case according to the present disclosure, the gas barrier layer including the stainless steel may be provided, and when the pouch film laminate that satisfies the specific thickness range is molded, the relational expression (Equation 1, D/{A−(R_P+R_D+C)}) of the thickness of the gas barrier layer, the length of the cup part, and the length of the flat part, etc. is about 0.01 or more. The pouch-type battery case manufactured according to the present disclosure may implement the pouch-type secondary battery in which the excellent level of the forming depth is secured while introducing the high-strength material with the excellent durability against the high heat and the high pressure into the pouch film laminate, and the mechanical strength and the cell energy density are improved at the same time.

While the present disclosure has been shown and described in connection with the exemplary embodiments, it will be apparent to those skilled in the art that modifications and variations can be made without departing from the spirit and scope of the disclosure as defined by the appended claims.

What is claimed is:

1. A pouch-type battery case comprising a pouch film laminate, the pouch-type battery case comprising:
 a cup part comprising a bottom surface and a side surface; and
 a flat part disposed around the cup part,
 wherein the side surface comprises a first curved portion, a second curved portion and a planar portion disposed between the first curved portion and the second curved portion, the first curved portion being defined between the bottom surface and the planar portion, the second curved portion being defined between the planar portion and the flat part;
 the pouch film laminate comprises a base material layer, a gas barrier layer, and a sealant layer, the gas barrier layer being disposed between the base material layer and the sealant layer,
 the gas barrier layer comprises stainless steel, and
 the pouch-type battery case being configured to satisfy an Equation 1 below:

$$0.01 \le D/\{A − (R_P + R_D + C)\} \le 0.0133 \qquad \text{[Equation 1]}$$

wherein D is a thickness of the gas barrier layer, A is a depth of the cup part along a depth direction of the cup part, R_P is a curvature radius of the first curved portion, R_D is a curvature radius of the second curved portion, C is a projected length of the planar portion transverse to the depth direction, wherein R_P is 0.5 mm to 1.5 mm, R_D is 1.5 mm to 3 mm, C is 1 mm to 2 mm, A is 8 mm to 10 mm, D is 0.05 mm to 0.1 mm, and (A−(R_p+R_d+C) is 4 mm to 6 mm.

2. The pouch-type battery case of claim 1, wherein the stainless steel comprises 10% wt to 20% wt of chromium.

3. The pouch-type battery case of claim 1, wherein the stainless steel comprises 5% wt to 20% wt of nickel.

4. The pouch-type battery case of claim 1, wherein the gas barrier layer has a melting point of 1,000° C. or more.

5. The pouch-type battery case of claim 1, wherein the base material layer has a thickness of 5 μm to 150 μm.

6. The pouch-type battery case of claim 1, wherein the base material layer comprises polyethylene terephthalate (PET).

7. The pouch-type battery case of claim 1, wherein the pouch film laminate has a thickness of 80 μm to 300 μm.

8. The pouch-type battery case of claim 1, further comprising a first case and a second case facing each other, at least one of the first case or the second case comprising the cup part.

9. A pouch-type secondary battery comprising the pouch-type battery case of claim 1.

10. A method for manufacturing a pouch-type battery case, the method comprising:
 providing a pouch film laminate comprising a base material layer, a gas barrier layer, and a sealant layer, the gas barrier layer being disposed between the base material layer and the sealant layer; and
 molding the pouch film laminate to form a cup part and a flat part, the cup part having a bottom surface and a side surface, the flat part being formed to surround the cup part, the side surface including a first curved portion, a second curved portion and a planar portion disposed between the first curved portion and the second curved portion, the first curved portion being defined between the bottom surface and the planar portion, the second curved portion being defined between the planar portion and the flat part, wherein the gas barrier layer comprises stainless steel,
 wherein the pouch-type battery case satisfies Equation 1 below:

$$0.01 \le D/\{A − (R_P + R_D + C)\} \le 0.0133 \qquad \text{[Equation 1]}$$

wherein D is a thickness of the gas barrier layer, A is a depth of the cup part in a depth direction, R_P is a curvature radius of the first curved portion, R_D is a curvature radius of the second curved portion, and C is a projected length of the planar portion transverse to the depth direction, wherein R_P is 0.5 mm to 1.5 mm, R_D is 1.5 mm to 3 mm, C is 1 mm to 2 mm, A is 8 mm to 10 mm, D is 0.05 mm to 0.1 mm, and (A−(R_p+R_d+C) is 4 mm to 6 mm.

11. A pouch-type battery case with a pouch film laminate, the pouch-type battery case comprising:
 a cup part and a flat part disposed around the cup part, the cup part including a bottom surface and a side surface; the side surface defining a first curved portion, a second curved portion and a planar portion disposed between the first curved portion and the second curved portion, the first curved portion being defined by a first radius between the bottom surface and the planar portion, the second curved portion being defined by a second radius between the planar portion and the flat part, the cup part having a depth extending along the side surface;

the pouch film laminate including a base material layer, a gas barrier layer, and a sealant layer, the gas barrier layer being disposed between the base material layer and the sealant layer, the gas barrier layer including stainless steel, wherein a first value of the cup part is defined by a sum of the first radius, the second radius and a projected length of the planar portion, the gas barrier layer having a thickness that is 1% to 1.33% of a difference between the depth and the first value of the cup part, wherein the first radius is 0.5 mm to 1.5 mm, the second radius is 1.5 mm to 3 mm, the projected length of the planar portion is 1 mm to 2 mm, the depth is 8 mm to 10 mm, the thickness of the gas barrier layer is 0.05 mm to 0.1 mm, and {the depth of the cup part−(the first radius+the second radius+the projected length of the planar portion)} is 4 mm to 6 mm.

12. The pouch-type battery case of claim 11, wherein the pouch film laminate has a thickness of 80 μm to 300 μm.

13. The pouch-type battery case of claim 11, wherein the stainless steel comprises 10% wt to 20% wt of chromium.

14. The pouch-type battery case of claim 11, wherein the stainless steel comprises 5% wt to 20% wt of nickel.

15. The pouch-type battery case of claim 11, wherein the gas barrier layer has a melting point of 1,000° C. or more.

16. The pouch-type battery case of claim 11, wherein the base material layer has a thickness of 5 μm to 150 μm.

\* \* \* \* \*